(12) United States Patent
BuAbbud et al.

(10) Patent No.: US 8,098,426 B2
(45) Date of Patent: Jan. 17, 2012

(54) TWO-WAY AMPLIFIER FOR PASSIVE OPTICAL NETWORK (PON)

(76) Inventors: George BuAbbud, Schresbury, MA (US); Cristiano Momatta, Milan (IT)

(*) Notice: Subject to any disclaimer, the term of this patent is extended or adjusted under 35 U.S.C. 154(b) by 426 days.

(21) Appl. No.: 12/468,998

(22) Filed: May 20, 2009

(65) Prior Publication Data

US 2010/0296156 A1  Nov. 25, 2010

(51) Int. Cl.
 *H01S 3/00* (2006.01)
(52) U.S. Cl. ............... 359/341.41; 359/341.2; 398/168; 398/160
(58) Field of Classification Search ............. 359/341.41, 359/341.2; 398/168, 160
See application file for complete search history.

(56) References Cited

U.S. PATENT DOCUMENTS

| | | | | |
|---|---|---|---|---|
| 7,734,180 B2* | 6/2010 | Maeda et al. | ................ | 398/79 |
| 2004/0091265 A1* | 5/2004 | Kim et al. | ................ | 398/72 |
| 2007/0064305 A1* | 3/2007 | Bogoni et al. | ............ | 359/341.41 |
| 2009/0154939 A1* | 6/2009 | Kim et al. | ................ | 398/168 |

* cited by examiner

*Primary Examiner* — Mark Hellner

(57) ABSTRACT

A two-way optical amplifier system amplifies upstream and downstream optical signals in a passive optical network (PON). The downstream optical amplifier system includes an optical amplifier (EDFA), configured and arrange to amplify the downstream optical transport signal. The upstream optical amplifier operates in burst mode and includes an upstream transport fiber receiving an upstream optical transport signal, an optical source coupled to the upstream transport fiber to generate a saturating optical input signal that is combined with the optical transport signal and establishes a baseline reference level for AGC of the optical transport signal, a PON input receiving an incoming PON RF return signals, a first optical amplifier configured and arrange to amplify with AGC and equalize the PON RF return signals with the optical transport signal, a beam combiner configured and arranged to combine said equalized PON RF return signals with said optical transport signal, and a second optical amplifier configured and arranged to amplify the optical transport signal including said equalized PON RF return signals.

20 Claims, 3 Drawing Sheets

TWO-WAY AMPLIFIER FOR PASSIVE OPTICAL NETWORK (PON)

BACKGROUND AND SUMMARY OF THE DISCLOSURE

The instant disclosure relates to an integrated video, voice, and data communications system. More particularly, the present disclosure relates to a fiber-to-the-home/curb (FTTx) network system that is capable of propagating returning RF terminal signals from a subscriber to a data service provider.

The increasing reliance on communication networks to transmit more complex data, such as voice and video traffic, is causing a high demand for bandwidth. To resolve this demand for bandwidth, communications networks are relying upon optical fiber to transmit this complex high bandwidth data. Conventional communication architectures that employ coaxial cables are slowly being replaced with communication networks that comprise only fiber optic cables. One advantage that optical fibers have over coaxial cables is that a much greater amount of information can be carried on an optical fiber.

While the FTTx optical network architecture has been a dream of many data service providers because of the aforementioned capacity of optical fibers, implementing the FTTx optical network architecture may encounter some problems associated with legacy systems that are in current use by subscribers. For example, many subscribers of data service providers use set top terminals (STTs) to receive and transmit information related to video services. In some existing networks, the conventional set top terminals are coupled to a coaxial cable. The coaxial cable, in turn, is then connected to fiber optic cables in a hybrid fiber-coax (HFC) system. The coaxial cable from the set top terminals in combination with the fiber optic cables provide a two way communication path between the set top terminal and the data service hub for purposes such as authorizing a subscriber to view certain programs and channels.

For example, conventional set top terminals coupled to coaxial cables may provide impulse pay-per-view (PPV) services. Impulse pay-per-view services require two way communications between the set top terminal and the data service provider. Another service that requires two-way communication passed between the set top terminal and the data service provider is video-on-demand (VOD) services.

For video on demand services, a subscriber can request a program of his choosing to be played at a selected time from a central video file server at the data service hub. The subscriber's VOD program request is transmitted upstream on a return path that comprises coaxial cables coupled to fiber optic cables. With the VOD service, a subscriber typically expects VCR-like control for these programs which includes the ability to "stop" and "play" the selected program as well as "rewind" and "fast forward" the program.

In conventional HFC systems, a return RF path from the subscriber to the data service hub is provided. The RF return path is needed because a conventional set top terminal modulates its video service upstream data onto an analog RF carrier. While the video service upstream data may be modulated onto an RF carrier, it is recognized that the upstream data may be in digital form.

An RF return path comprises two-way RF distribution amplifiers with coaxial cables and two-way fiber optic nodes being used to interface with fiber optic cables. A pair of fiber optic strands can be used to carry the radio frequency signals between the head end (HE) and node in an analog optical format. Each optical cable of the pair of fiber optic strands carries analog RF signals: one carries analog RF signals in the downstream direction (toward the subscriber) while the other fiber optic cable carries analog RF signals in the reverse or upstream direction (from the subscriber). The high speed (Internet access) data service uses the same type of transmission with downstream RF modulated signals and upstream TDMA RF modulated burst mode signals. The subscriber premise equipment in this case is the Cable Modem.

Unlike HFC systems, conventional FTTx systems typically do not comprise a return RF path from the subscriber to the data service hub because the return paths comprise only fiber optic cables that propagate digital data signals as opposed to analog RF signals. In FTTx systems, a downstream RF path is provided because it is needed for the delivery of television programs that use conventional broadcast signals. This downstream RF path can support RF modulated analog and digital signals as well as RF modulated control signals for any set top terminals that may be used by the subscriber. However, as noted above, FTTx systems do not inherently provide any integrated capability of supporting a return RF path for RF analog signals generated by the legacy set top terminal. However, in order to provide PPV or VOD types of services, a secondary RF return path must be provided.

In prior art systems, multimedia service providers with an existing bi-directional data network have attempted to provide an RF return path overlayed onto the existing two-way data (time division multiplexed on same wavelength as upstream data). The upstream RF data is separated from the RF video signal at the subscribers home and overlayed onto an existing optical data stream being communicated to the service provider as part of a data service.

In more recent FTTx systems 10, such as shown in FIG. 1, the upstream RF signal is converted to a separate optical signal (different wavelength) (RF Return ONT) 12 at the subscriber's optical network termination device (ONT) 14, and is carried optically, through a local node 16, to a hub 18, with all of the other data streams on the same fiber. This all-optical network existing between the subscriber and the node 16 or hub 18 is called a passive optical network (PON). The PON comprises a point-to-multipoint downstream fiber network and a multipoint-to-point upstream fiber network. The current implementation of PON architecture requires four different data streams operating on four different optical wavelengths to achieve two-way broadband data, downstream video, and upstream video control.

FIG. 2 illustrates the wavelengths of the different optical signals within the PON. Downstream video (broadcast sub-carrier modulation SCM) (C-band) 20 is transmitted between 1525 nm and 1565 nm while upstream video control data (return SCM) (L-band) 22 is transmitted at about 1570 nm. For broadband data, the downstream data signal is transmitted between 1400 nm and 1500 nm (S-band) 24 while the returning upstream data signal is transmitted at a wavelength below 1400 nm (O-band) 26.

Now turning to the issue of the disclosure. The key to successful low-cost implementation of a PON is to eliminate any electronic components in the network pipleline. In this regard, the aggregated bi-directional optical signals travelling between a subscriber's ONT 14 and the local network hub 18 travel on optical fiber. The distance between a subscriber's ONT and the service provider's hub is typically about 5 to 20 kilometers. The network is laid out in such a manner that the optical components at the subscriber's ONT 14 and the service provider's hub 18 are sufficiently powerful to transmit and receiver the optical signals over the distance therebetween. However, once the optical signals reach the hub 18 there are several issues with which the service provider must contend. The first issue is amplification. The distance between hubs 18 can be much longer and the optical signals must be amplified to reach the next hub 18.

For purposes of the present disclosure, we are going to broadly identify that once the aggregated optical signals reach the service provider hub 18, the two broadband data signals are separated (by WDM splitters 28,30) from the two RF video signals and that the broadband optical signals and the video optical signals are handled along separate parallel paths (OLT 32). Amplification of the broadband data is handled separately and will not be discussed in detail other than to say that the data network systems inherently provide for two way amplification and transmission of the optical data signals as the broadband data system is intended to be a two-way data stream.

However, on the other hand, the video portion of these systems was not originally intended to be a two-way system. Video, until recently, was a one-way broadcast system. The hub systems are typically provided with a downstream amplifier (EDFA or erbium doped fiber amplifier) 34 for amplifying the downstream video signal. EDFA's are well known in the communication art for amplifying optical signals in the 1550 nm optical transmission window. The existing service provider hubs 18 do not have a way to transmit the upstream return SCM signal 36 (now in optical format) for transport back to the central office (CO) or head end (HE). Again referring to FIG. 1, in order to get the return SCM signal 36 back to the HE 38, the service providers have outfitted the existing hubs 18 with optical to electrical converters (O/E) 40 which receive the optical signal, convert it back to an electrical signal, and transmits the electrical signal back the HE 38 on existing twisted pair Gigabit Ethernet (Gbe) cables 42. The existing fiber optic backbone typically includes twisted pair lines, which can carry an electrical signal back to the HE. These retrofitted prior art systems require a plurality of optical receivers, associated O/E converters, and associated Gbe network adapters, all for the purpose of carrying back control signals for VOD and PPV. Needless to say, it is obvious that the fixed costs for providing all of this extra electronic equipment at each hub, not to mention the ongoing costs for powering and maintaining all of the extra equipment is quite high. Another similar system with multiple hubs is shown in FIG. 3 where it can be seen that each hub has a separate Gbe feed 42 back to the HE 38. It is also noted that the HE also requires the same type of electrical equipment to receive the multiple data streams.

Although effective, the multitude of optical receivers, O/E converters, E/O converters, analog to digital converters (ADC), digital to analog converters (DAC), GBe transmitters and Gbe receivers make transport of the return RF signal to the HE highly complicated and very expensive.

Accordingly, there is a need in the art for a system and method for communicating optical signals between a data service provider and a subscriber that eliminates the use of electrical wires and the plethora of related electronic hardware and software necessary to support the data signals propagating along the electrical wires. There is also a need in the art for a system and method that provides a return path for RF signals that are generated by legacy video service terminals (cable modems). Another need exists in the art for supporting legacy video service controllers and terminals with an all-optical network architecture.

The instant disclosure provides an all-optical video communication network where the upstream RF data signal remains in optical form until it reaches the HE.

As described above, the return RF signal is converted to an optical signal at the subscriber ONT and transmitted over the existing PON to the hub. However, in the improved system as taught by the disclosure, the hub is now provided with an upstream amplifier that will split off the upstream RF signal (L-band) from the rest of the signal, combine it with an upstream transport signal and amplify the combined signal for transport to the next hub, where it will eventually reach the HE.

As is understood in the art, the downstream SCM video signal (C-band) is at a substantially constant bias level and can be amplified uniformly using a conventional fiber amplifier. However, the upstream RF signal is a combination of a plurality of time division multiplexed (TMD) burst mode signals from the various ONT's, each originating from a different location at a different distance from the hub. Since optical signals are known to degrade over distance, particularly in a PON, the amplitude of each burst is different as it reaches the hub. For example, a burst originating from an ONT 5 km from the hub will be much higher than a burst originating from an ONT 20 km from the hub. Therefore certain accommodations must be made to equalize the incoming burst signals from the different PON's as well as to equalize the incoming burst signals with the overall transport signal with which it is being combined.

According to the disclosure, the upstream amplifier is provided with a saturating pilot tone, which establishes a consistent reference baseline for the signal and for amplification, and allows unlimited combination of the upstream signal.

More specifically, the upstream burst mode amplifier system includes a transport fiber configured and arranged to receive an upstream optical transport signal. An optical source (laser diode) is coupled to the upstream transport fiber wherein the optical source is configured and arranged to generate a saturating optical input signal that is combined with the optical transport signal to establish a baseline reference level for the optical transport signal. The upstream amplifier further includes a PON input configured and arranged to receive an incoming WDM optical signal from a PON. The incoming WDM optical signal includes the PON return RF control signals. A WDM splitter coupled to the PON input fiber splits the PON return RF control signals from the incoming WDM optical signal so that it can be input into the amplifier blocks. An optical amplifier is coupled to the output of the WDM splitter to pre-amplify the PON RF control signals and equalize the PON RF control signals with the power level of the optical transport signal as now established by the saturating input signal. A beam combiner combines the PON RF control signals with the optical transport signal and they are input into a second optical amplifier to amplify the optical transport signal, which now includes the pre-amplified PON RF control signals. A second optical source generating a second saturating input tone for the incoming PON signals can also be implemented to equalize the incoming PON RF signals prior to amplification.

By setting a baseline reference signal for the upstream transport signal, as well as equalizing and amplifying the PON return RF signals with the transport signal, the system provides for a consistent and stable upstream return path which can remain in all optical format until it reaches the head end (HE). Further by combining the upstream amplifier with a downstream amplifier in a single amplifier block, the disclosure allows the service provider to eliminate virtually all of the electronic system components from the network, providing a significant cost savings in equipment and ongoing power and maintenance costs.

Accordingly, it is an object of the present disclosure to provide for a system and method for communicating optical signals between a data service provider and a subscriber that eliminates the use of electrical wires and the plethora of related electronic hardware and software necessary to support the data signals propagating along the electrical wires.

Other objects, features and advantages of the disclosure shall become apparent as the description thereof proceeds when considered in connection with the accompanying illustrative drawings.

BRIEF DESCRIPTION OF THE DRAWINGS

In the drawings which illustrate the best mode presently contemplated for carrying out the present disclosure.

SPECIFIC DESCRIPTION

Figure 4:
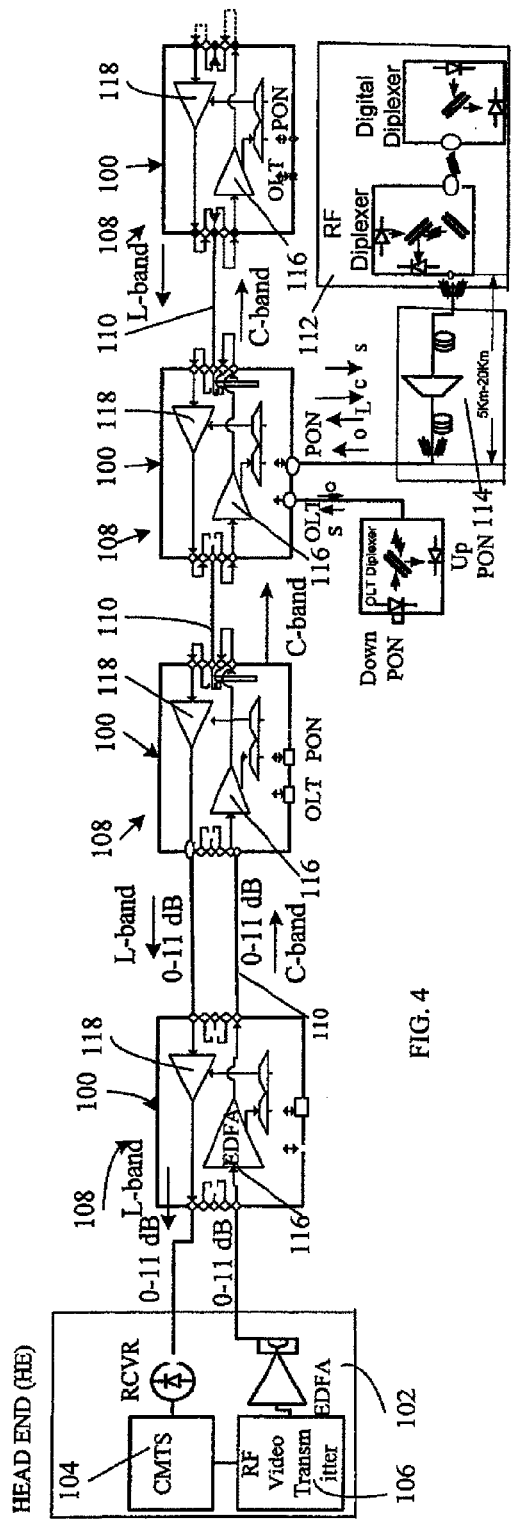
FIG. 4 is a schematic illustration of the improved PON architecture in accordance with the teachings of the present disclosure.
Figure 5:
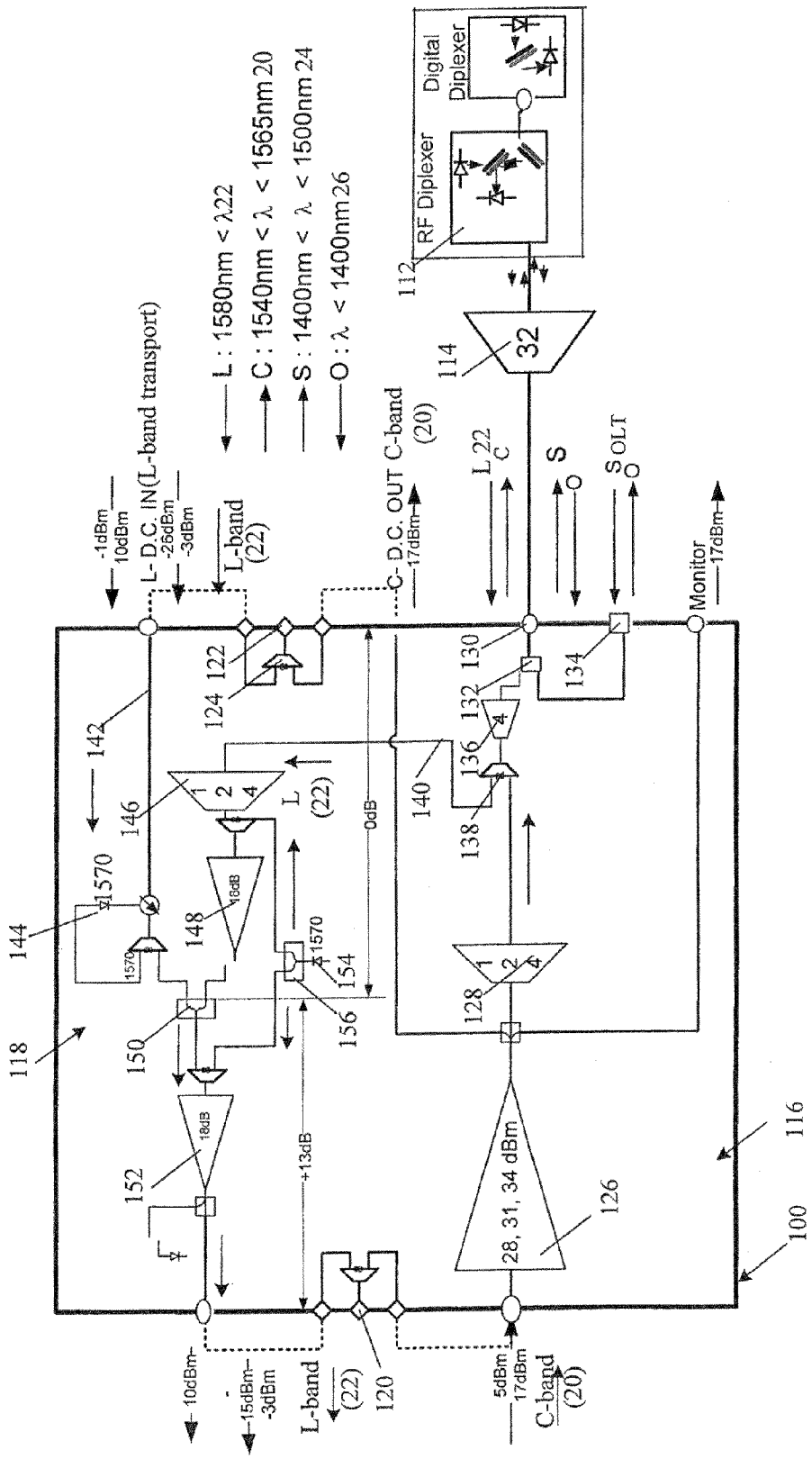
FIG. 5 is a detailed schematic illustration of the two-way amplifier of the present disclosure.

Referring now to the drawings, the two-way amplifier of the instant disclosure is illustrated and generally indicated at 100 in FIGS. 4-5. As will hereinafter be more fully described, the instant disclosure provides an all optical video communication network where the upstream RF data signal remains in optical form until it reaches the HE. Generally, as described hereinabove, the modulated return RF signal is converted to an optical signal at the subscriber ONT and transmitted over the existing PON to the network hub. In the present system as taught by the disclosure, the hub is provided with an upstream amplifier that splits off the upstream modulated RF signal from the rest of the signal, combines it with an upstream transport signal and amplifies the combined signal for transport to the next hub, where it will eventually reach the HE.

Referring to FIG. 4, the overall network architecture comprises a point-to-multipoint downstream fiber network and a multipoint-to-point upstream fiber network. The network comprises a head end (HE) 102 including a cable modem termination system (CMTS) 104 and RF SCM (sub-carrier modulated) video transmitter system 106, a plurality of network hubs 108 serially connected with optical fiber 110, a plurality of subscriber optical network terminal devices (ONT's) 112, and at least one network node 114 that aggregates and distributes network signals to and from the subscriber ONT's 112. Only one ONT is shown in the drawing figures. However, it is to be understood that each node generally services 32 subscriber ONT's. Each hub has multiple PON inputs (16) and generally services 512 subscribers. Other configurations and service levels are also within the scope of the disclosure. Alternatively, the network can comprise a ring network, or other type of network. However, for purposes of the disclosure, it is easier to describe the system in a linear point to multi-point system.

Each of the network hubs 108 includes one of the two-way amplifiers 100 in accordance with the present disclosure. Each amplifier 100 in turn includes downstream amplifier block generally indicated at 116 and an upstream burst mode amplifier block generally indicated at 118 and the appropriate connectors for splitting in the incoming and outgoing optical signals.

Figure 1:
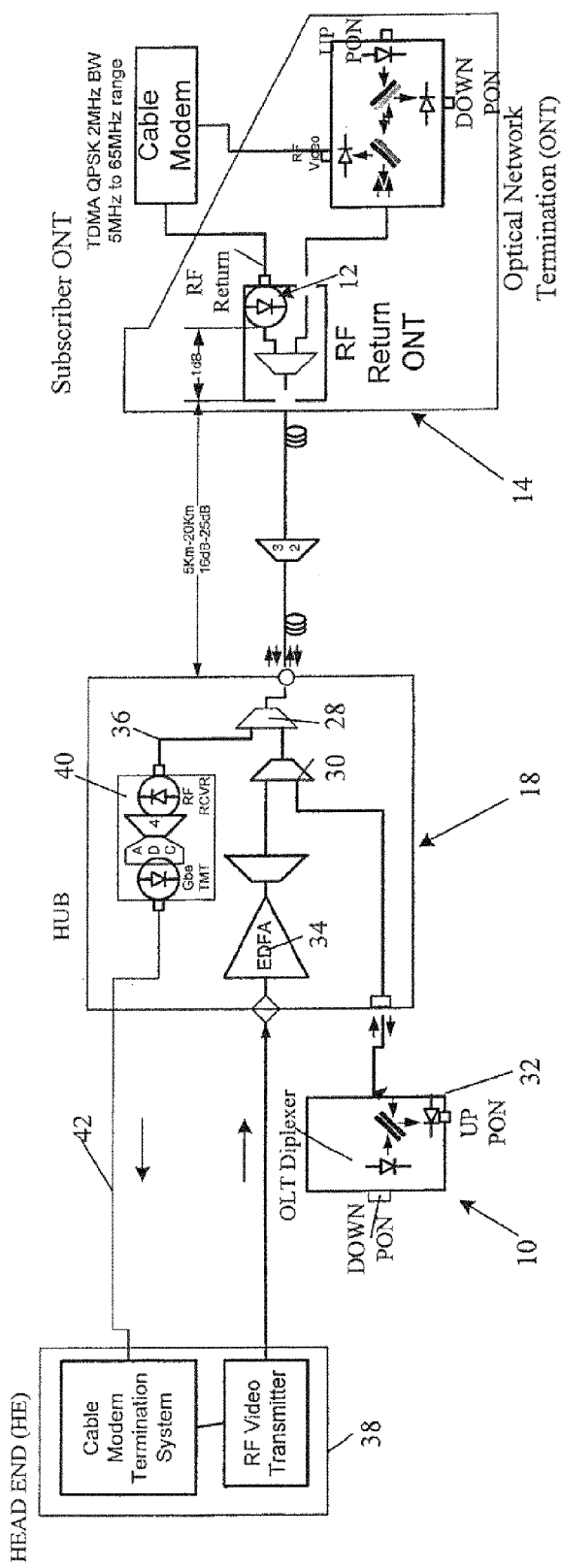
FIG. 1 is a schematic illustration of a prior art PON architecture where the return RF signals are converted back to electrical signals at the hub.
Figure 2:
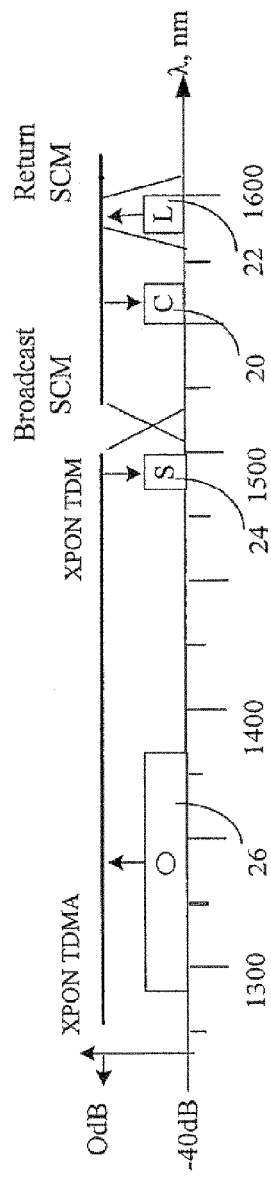
FIG. 2 is an illustration showing the various optical wavelengths on which data is transmitted in a PON.
Figure 3:
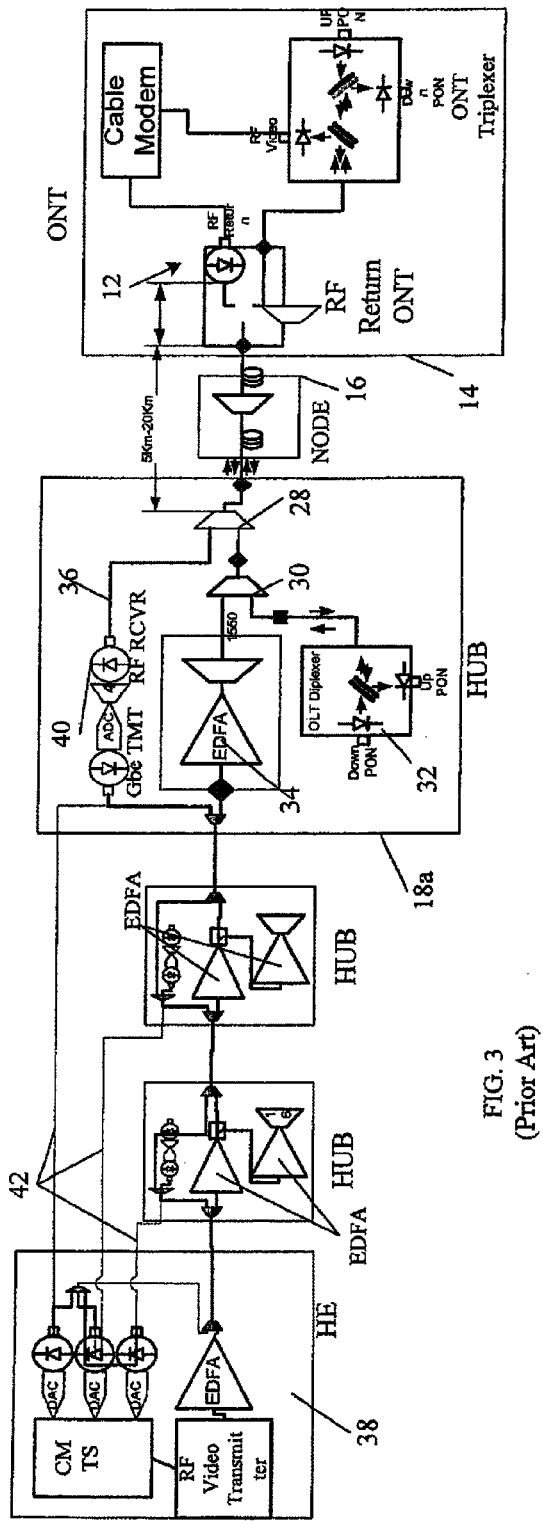
FIG. 3 is a schematic illustration of another prior art PON architecture where the return RF signals from several hubs are converted back to electrical signals at the hubs and transmitted in parallel back to the head end (HE)

Referring to FIGS. 2, 4 and 5, the current implementation of PON architecture requires four different data streams operating on four different optical wavelengths to achieve two-way broadband data, downstream video, and upstream video control. FIG. 2 illustrates the wavelengths of the different optical signals within the PON. Downstream video (broadcast sub-carrier modulation SCM) (C-band) 20 is transmitted between 1525 nm and 1565 nm while upstream video control data (return SCM) (L-band) 22 is transmitted at about 1570 nm. For broadband data, the downstream data signal is transmitted between 1400 nm and 1500 nm (S-band) 24 while the returning upstream data signal is transmitted at a wavelength below 1400 nm (O-band) 26. FIGS. 4 and 5 provide some additional context to the directionality of the different wavelengths and their relationship in the subject system. For purposes of the present disclosure, we will focus on the return path of the L-band wavelength 22, which carries the return RF signal.

We turn now to FIG. 5, which shows a block level illustration of the two-way amplifier 100 of the present disclosure. Generally, the two-way amplifier includes 100 an upstream optical port 120, which receives the downstream C-band optical signal 20 from the upstream hubs 108 and HE 102 and transmits the upstream L-band signal 22 from the PON's and further downstream hubs 108, and further includes a downstream optical port 122, which transmits the downstream C-band signal 20 to the next hub 118, and receives the upstream L-band signal 22 from the downstream hubs 118. These are the main connections to transport the optical signal through the two-way amplifier 100. As will explained further herein, the downstream optical port 122 includes a splitter 124, which on the upstream path divides the L-band signal 22 for delivery to the upstream amplifier block 118.

Dealing first with the downstream amplifier block 116, the downstream SCM video signal (C-band) 20 is at a substantially constant bias level and can be amplified uniformly using a conventional erbium doped fiber amplifier (EDFA) generally indicated at 126. As indicated above, EDFA's are commonly known in the telecommunication arts for amplifying optical signals in the 1550 nm communication window. The downstream amplifier block 116 further includes a WDM splitter 128, which permits split of the signal for delivery to multiple PON's connected to the two-way amplifier. Further details of the downstream EDFA configuration will not be discussed in detail.

Now turning to the upstream amplifier block 118, the object of the disclosure is to continue to transmit an upstream return RF transport signal back to the HE 102 while also combining the incoming upstream return RF signals from the incoming PON's with the existing transport signal. As explained hereinabove, the upstream RF signal is a combination of a plurality of time division multiplexed (TMD) burst mode signals from the various PON's and ONT's 112, each originating from a different location at a different distance from the hub 118. Since optical signals are known to degrade over distance, particularly in a PON, the amplitude of each burst is different as it reaches the hub 118. For example, a burst originating from an ONT 5 km from the hub will be much higher than a burst originating from an ONT 20 km from the hub.

The two-way amplifier 100 is provided with a plurality of PON ports 130 (only one shown), which allow connection of multiple PON's (or nodes 114) to the two-way amplifier 100. Each of the PON connections 130 is first connected to a splitter MUX/DEMUX 132, which divides off the wavelengths carrying the broadband data streams (O-band and S-band) from the PON 114 and delivers them in/out to another connection port 134 for transfer to an optical line termination (OLT) connection (not shown). This is where the broadband data signals are handled on a parallel optical path. The other output from the MUX/DEMUX 132 is connected to a MUX/DEMUX 136, which splits and delivers the downstream C-band signal 20 to each of the PONS 114, while also aggregating the upstream L-band signals 22. The output from this splitter 136 is again connected to another splitter 138, which separates the upstream L-band signal 22 onto another output 140 for delivery to the upstream amplifier block 118.

According to the disclosure, in order for the incoming upstream return RF signals (from the PON's) (output 140) to be combined with the existing upstream transport signal 22 (from the downstream hub) and then the combined signal amplified, the existing transport signal 22 must be set to a consistent reference level, the incoming return RF signals 22 (140) must also be set to a consistent reference level, and the incoming return RF signals must also be pre-amplified at a level consistent with the new baseline reference level of the transport signal 22.

More specifically, the upstream amplifier block 118 includes an input transport fiber 142 is configured and arranged to receive the upstream optical transport signal 22 (from a downstream hub). To establish a reference level (bias), an optical source 144 (laser diode) is coupled to the upstream transport fiber 142 wherein the optical source 144 is configured and arranged to generate a saturating optical input signal that is combined with the optical transport signal 22 to establish a baseline reference level for the optical transport signal. This saturating input signal sets the burst mode signal baseline reference and provides for automatic gain control (AGC) of the amplifier. This optical source 144 includes a feedback loop for constant bias of the diode.

To pre-amplify the incoming PON RF return signals (output 140), the output from splitter 138 is combined with other PON inputs in a beam combiner 146, and then coupled to a rare-earth doped (erbium) amplifier (EDFA) 148. The amplifier increases the amplitude of the input signal and equalizes the PON RF control signals with the power level of the optical transport signal as now established by the saturating input signal. The EDFA 148 is of a type well known in the art for communication systems.

A beam combiner 150 then combines the equalized PON RF control signals with the optical transport signal and they are input into a second rare-earth doped optical amplifier (EDFA) 152 to amplify the optical transport signal, which now includes the equalized PON RF control signals.

In addition, the upstream amplifier block 118 also provides for equalization of the incoming PON RE signals. In this regards, a second optical source 154 (laser diode) is combined with the incoming PON RF signal prior to being amplified in the first amplifier (pre-amp) 148. The second optical source 154 is configured and arranged to generate a saturating optical input signal that establishes a baseline reference level for the incoming PON RF signals. Similarly, the saturating optical input signal is split at 156 and combined again with the combined transport signal and pre-amplified PON RF signals for further equalization prior to final amplification at 152.

By setting baseline reference signals for the upstream transport signal, and equalizing the PON return RF signals with the transport signal, the system provides for a consistent and stable upstream return path which can remain in all optical format until it reaches the head end (HE). Further, by combining the upstream amplifier 118 with a downstream amplifier 116 in a single amplifier system, the disclosure allows the service provider to eliminate virtually all of the O/E electronic system components from the network hubs and head end, providing a significant cost savings in equipment and ongoing power and maintenance costs.

It can therefore be seen that the present disclosure provides a system and method for communicating optical signals between a data service provider and a subscriber that eliminates the use of electrical wires and the plethora of related electronic hardware and software necessary to support the data signals propagating along the electrical wires. For these reasons, the instant disclosure is believed to represent a significant advancement in the art, which has substantial commercial merit.

While there is shown and described herein certain specific structure embodying the disclosure, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A burst mode optical amplifier system for amplifying upstream burst mode optical RF modulated return signals in a passive optical network (PON) comprising:
   a transport input fiber configured and arranged to receive an optical transport signal;
   an optical source coupled to said transport input fiber, said optical source being configured and arranged to generate a saturating optical input signal that is combined with said optical transport signal and establishes a baseline reference level for said optical transport signal;
   a PON input fiber configured and arranged to receive an incoming WDM optical signal from a PON, said incoming WDM optical signal including PON RF return signals;
   a WDM splitter coupled to said PON input fiber to split said PON RF return signals from said incoming WDM optical signal;
   a first optical amplifier coupled to an output of said WDM splitter, said first optical amplifier being configured and arrange to amplify with automatically controlled constant gain said PON RF return signals and equalize said PON RF return signals with said optical transport signal;
   a beam combiner configured and arranged to combine said equalized PON RF return signals with said optical transport signal; and
   a second optical amplifier coupled to an output of said beam combiner and being configured and arranged to amplify with automatically controlled constant gain said optical transport signal including said equalized PON RF return signals.

2. The burst mode optical amplifier system of claim 1 further comprising a beam combiner configured and arranged to receive and combine a plurality of incoming WDM optical signals from a plurality of PON's.

3. The burst mode optical amplifier system of claim 1, wherein said first and second optical amplifiers are pumped by a common optical pump source.

4. The burst mode optical amplifier system of claim 1, wherein said first and second amplifiers are configured and arranged to compensate for signal losses incurred within said amplifier system.

5. The burst mode optical amplifier system of claim 1 further comprising a second optical source configured and arranged to generate a saturating optical input signal that is combined with said PON RF return signals and establishes a baseline reference level for said automatically controlled constant gain for said PON RF return signals prior to amplification.

6. The burst mode optical amplifier system of claim 5 wherein said saturating optical input signal is further combined with said combined optical transport signal including said equalized PON RF return signals to further equalize said transport signal prior to final amplification.

7. A two-way optical amplifier system for amplifying upstream and downstream optical signals in a passive optical network (PON) comprising:
  a downstream optical amplifier system comprising,
    a downstream transport input fiber configured and arranged to receive a downstream optical transport signal,
    a downstream optical amplifier coupled to said downstream transport input fiber, said downstream optical amplifier being configured and arrange to amplify said downstream optical transport signal; and
  a burst mode upstream optical amplifier system comprising,
    an upstream transport input fiber configured and arranged to receive an optical transport signal,
    an optical source coupled to said transport input fiber, said optical source being configured and arranged to generate a saturating optical input signal that is combined with said optical transport signal and establishes a baseline reference level for automatically controlled constant gain of said optical transport signal,
    a PON input fiber configured and arranged to receive an incoming WDM optical signal from a PON, said incoming WDM optical signal including PON RF return signals,
    a WDM splitter coupled to said PON input fiber to split said PON RF return signals from said incoming WDM optical signal,
    a first optical amplifier coupled to an output of said WDM splitter, said first optical amplifier being configured and arrange to amplify with automatically controlled constant gain said PON RF return signals and equalize said PON RF return signals with said optical transport signal,
    a beam combiner configured and arranged to combine said equalized PON RF return signals with said optical transport signal, and
    a second optical amplifier coupled to an output of said beam combiner and being configured and arranged to amplify said optical transport signal including said equalized PON RF return signals.

8. The two way optical amplifier system of claim 7 further comprising a beam combiner configured and arranged to receive and combine a plurality of incoming WDM optical signals from a plurality of PON's.

9. The two way optical amplifier system of claim 7, wherein said first and second optical amplifiers are pumped by a common optical pump source.

10. The two way optical amplifier system of claim 7, wherein said first and second amplifiers are configured and arranged to compensate for signal losses incurred within said amplifier system.

11. The two way optical amplifier system of claim 7 further comprising a second optical source configured and arranged to generate a saturating optical input signal that is combined with said PON RF return signals and establishes a baseline reference level for automatically controlled constant gain of said PON RF return signals prior to amplification.

12. The two way optical amplifier system of claim 11 wherein said saturating optical input signal is further combined with said combined optical transport signal including said equalized PON RF return signals to further equalize said transport signal prior to final amplification.

13. A two-way optical amplifier system for amplifying upstream and downstream optical signals in a passive optical network (PON) comprising:
  a downstream optical amplifier system comprising,
    a downstream transport input fiber configured and arranged to receive a downstream optical transport signal,
    a downstream optical amplifier coupled to said downstream transport input fiber, said downstream optical amplifier being configured and arrange to amplify said downstream optical transport signal; and
  a burst mode upstream optical amplifier system comprising,
    an upstream transport input fiber configured and arranged to receive an optical transport signal,
    an optical source coupled to said transport input fiber, said optical source being configured and arranged to generate a saturating optical input signal that is combined with said optical transport signal and establishes a baseline reference level for automatically controlled constant gain of said optical transport signal,
    a PON input fiber configured and arranged to receive an incoming WDM optical signal from a PON, said incoming WDM optical signal including PON RF return signals,
    a WDM splitter coupled to said PON input fiber to split said PON RF return signals from said incoming WDM optical signal,
    a beam combiner configured and arranged to combine said PON RF return signals with said optical transport signal, and
    an upstream optical amplifier coupled to an output of said beam combiner and being configured and arranged to amplify with automatically controlled constant gain said optical transport signal including said PON RF return signals.

14. The two way optical amplifier system of claim 13 further comprising a beam combiner configured and arranged to receive and combine a plurality of incoming WDM optical signals from a plurality of PON's.

15. The two way optical amplifier system of claim 13 further comprising a second optical source configured and arranged to generate a saturating optical input signal that is combined with said PON RF return signals and establishes a baseline reference level for automatically controlled constant gain of said PON RF return signals prior to amplification.

16. The two way optical amplifier system of claim 15 wherein said saturating optical input signal is further combined with said combined optical transport signal including said equalized PON RF return signals to further equalize said transport signal prior to final amplification.

17. A burst mode optical amplifier system for amplifying upstream burst mode optical RF modulated return signals in a passive optical network (PON) comprising:
  a transport input fiber configured and arranged to receive an optical transport signal;

an optical source coupled to said transport input fiber, said optical source being configured and arranged to generate a saturating optical input signal that is combined with said optical transport signal and establishes a baseline reference level for automatically controlled constant gain of said optical transport signal;

a PON input fiber configured and arranged to receive an incoming WDM optical signal from a PON, said incoming WDM optical signal including PON RF return signals;

a WDM splitter coupled to said PON input fiber to split said PON RF return signals from said incoming WDM optical signal;

a beam combiner configured and arranged to combine said PON RF return signals with said optical transport signal; and an optical amplifier coupled to an output of said beam combiner and being configured and arranged to amplify with automatically controlled constant gain said optical transport signal including said PON RF return signals.

18. The burst mode optical amplifier system of claim 17 further comprising a beam combiner configured and arranged to receive and combine a plurality of incoming WDM optical signals from a plurality of PON's.

19. The burst mode optical amplifier system of claim 17 further comprising a second optical source configured and arranged to generate a saturating optical input signal that is combined with said PON RF control signals and establishes a baseline reference level for automatically controlled constant gain of said PON RF return signals prior to amplification.

20. The burst mode optical amplifier system of claim 19 wherein said saturating optical input signal is farther combined with said combined optical transport signal including said equalized PON RF return signals to further equalize said transport signal prior to final amplification.

* * * * *